United States Patent
Dunham et al.

(10) Patent No.: US 10,546,011 B1
(45) Date of Patent: Jan. 28, 2020

(54) TIME CODE TO BYTE INDEXER FOR PARTIAL OBJECT RETRIEVAL

(71) Applicant: Amazon Technologies, Inc., Seattle, WA (US)

(72) Inventors: Jeremiah Dunham, Portland, OR (US); Andrew Tunall, Portland, OR (US); Benjamin Schwartz, Portland, OR (US); Jason LaPier, Portland, OR (US); Justin Abrahms, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 15/274,865

(22) Filed: Sep. 23, 2016

(51) Int. Cl.
  *G06F 16/41*    (2019.01)
  *G10L 15/08*    (2006.01)
  *G10L 15/18*    (2013.01)
  *G10L 15/04*    (2013.01)
  *G06F 16/13*    (2019.01)
  *G06F 16/48*    (2019.01)
  *H04L 29/06*    (2006.01)

(52) U.S. Cl.
  CPC ............. *G06F 16/41* (2019.01); *G06F 16/13* (2019.01); *G06F 16/489* (2019.01); *G10L 15/04* (2013.01); *G10L 15/08* (2013.01); *G10L 15/1822* (2013.01); *G10L 2015/088* (2013.01); *H04L 67/42* (2013.01)

(58) Field of Classification Search
  CPC ..................... G06F 17/30858; G06F 17/30823
  See application file for complete search history.

(56) References Cited

U.S. PATENT DOCUMENTS

| | | | | |
|---|---|---|---|---|
| 5,428,774 A | * | 6/1995 | Takahashi | G06F 17/30817 345/960 |
| 5,794,249 A | * | 8/1998 | Orsolini | G06F 17/30787 704/200 |
| 5,953,073 A | * | 9/1999 | Kozina | G06F 17/30784 348/558 |
| 9,361,011 B1 | * | 6/2016 | Burns | G06F 17/30825 |

(Continued)

OTHER PUBLICATIONS

O'Neill, How to Set Start and End Times on YouTube Embeds, Jul. 3, 2012 https://www.adweek.com/digital/start-end-times-youtube-embeds/ (Year: 2012).*

*Primary Examiner* — William Spieler
(74) *Attorney, Agent, or Firm* — Knobbe Martens Olson & Bear LLP (57) ABSTRACT

A time code to byte conversion system is provided herein that maps time codes to byte ranges such that a user device can retrieve a portion of, but not all of, a media file by specifying a time range. For example, the time code to byte conversion system can play a media file and identify the byte at which each time code begins. The time code to byte conversion system can then store the byte to time code mapping in an index accessible by a media retrieval server. A user device can then provide a time range to the media retrieval server, the media retrieval server can query the index to identify the range of bytes that corresponds to the provided time range, and then the media retrieval server can retrieve the identified range of bytes from a media database for transmission to the user device.

21 Claims, 5 Drawing Sheets

(56) References Cited

U.S. PATENT DOCUMENTS

| | | | | |
|---|---|---|---|---|
| 2001/0043795 | A1* | 11/2001 | Wood | G06F 17/30796 |
| | | | | 386/239 |
| 2003/0200091 | A1* | 10/2003 | Furuyama | G06F 17/30017 |
| | | | | 704/254 |
| 2007/0130159 | A1* | 6/2007 | Gulli | G06F 17/3084 |
| 2015/0206544 | A1* | 7/2015 | Carter | G10L 25/78 |
| | | | | 704/235 |

* cited by examiner

TIME CODE TO BYTE INDEXER FOR PARTIAL OBJECT RETRIEVAL

BACKGROUND

Recently, media content in digital formats has become widely available via network-accessible systems. For example, users can stream or download digital media from various network-accessible systems for viewing on televisions, computers, mobile phones, and other such user devices. In the case of digital video media, the video resolution of such media has also improved over time due to advancements in cameras and display devices.

However, while the improvement in video resolution has resulted in an improved visual experience, the improvement in video resolution has also caused new problems. For example, the file size of digital media files has continued to increase as video resolution improves. Network bandwidth may be limited and thus users may experience increased latency in retrieving digital media files from network-accessible systems. In addition, memory space can be limited and thus certain user devices may not have enough memory available to retrieve and store larger files.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, the size of digital media files can increase retrieval latency and/or cause storage issues. In some cases, a user may not actually want to retrieve an entire media file. For example, the user may wish to view and/or hear a portion of, but not all of, the media file. As an illustrative example, a media file may be a taped baseball game, and the runtime may be three hours. The user, however, may only wish to view a certain play that occurred during the baseball game over the span of a single minute, such as a homerun. In conventional systems, despite the fact that the user only wishes to view less than 1% of the media file, the user would nonetheless have to (1) retrieve the entire media file; and (2) instruct the media player to skip ahead to the time at which the play occurred. Thus, it may be desirable to provide a network-accessible system in which a user can retrieve just a portion of a media file that corresponds to a specified time range. In this way, the user would experience reduced retrieval latency and the limited amount of memory may not be a concern.

However, it may be difficult to identify the appropriate portion of a media file to transmit to a user device if provided with just a specified time range. For example, an original, raw version of a media file may be very large. Thus, many network-accessible systems encode and/or compress raw media files for distribution to user devices. There are many types of encoding and/or compression algorithms available, and each of them processes the bits of a raw media file in different ways. In fact, individual frames in a media file may be processed at different ratios by the same encoding and/or compression algorithm based on action occurring in the frame, the similarity or dissimilarity of colors in the frame, the brightness level, the contrast level, and/or the like. Thus, there often is a nonlinear relationship between ranges of bits or bytes in a media file and time ranges. For example, a time range (e.g., 10 seconds) may correspond to a first range of bytes (e.g., 64 bytes) in a first portion of a media file, but may correspond to a second range of bytes that is different than the first range of bytes (e.g., 128 bytes) for a second portion of the same media file. Given this nonlinear relationship and the fact that different encoding and/or compression algorithms process raw media files in different ways, network-accessible systems cannot assume that each range of bytes corresponds to the same time range and retrieve and transmit bytes to the user devices accordingly.

Thus, described herein is a time code to byte conversion system that maps time codes to byte ranges such that a user device can retrieve a portion of, but not all of, a media file by specifying a time range. For example, the time code to byte conversion system can play a media file and identify the byte at which each time code begins. The time code to byte conversion system can then store the byte to time code mapping in an index accessible by a media retrieval server. A user device can then provide a time range to the media retrieval server, the media retrieval server can query the index to identify the range of bytes that corresponds to the provided time range, and then the media retrieval server can retrieve the identified range of bytes from a media database for transmission to the user device.

In addition, the time code to byte conversion system may include a speech recognition system that (1) identifies a mapping between time codes and audio segments in a media file; (2) converts the audio segments into text; and (3) creates a mapping between the time codes and the text. A natural language processor may process the text to identify keywords, such as words that describe the content of the media file. Thus, the time code to byte conversion system may create a mapping between time codes and keywords and this mapping can also be stored in the index. Accordingly, instead of specifying a time range and receiving a corresponding portion of a media file, the user device can specify a keyword(s) and receive a corresponding portion of the media file. Additional details of the byte range conversion system and the media retrieval server are described below with respect to FIGS. 1-4.

Example Time Code to Byte Indexing Environment

Figure 1:
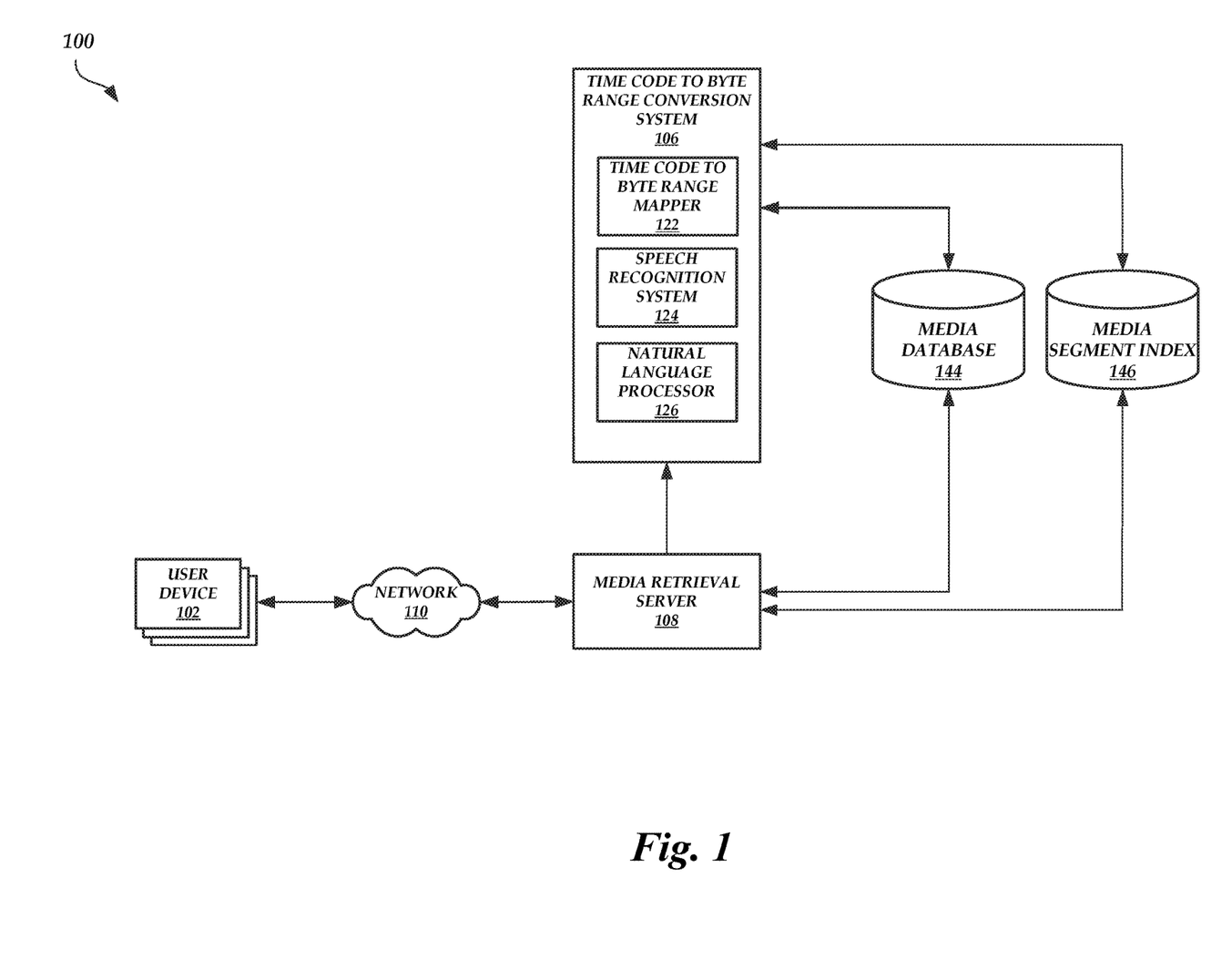
FIG. 1 is a block diagram of a time code to byte indexing environment, according to one embodiment.

FIG. 1 is a block diagram of a time code to byte indexing environment 100, according to one embodiment. As illustrated in FIG. 1, the time code to byte indexing environment 100 includes user devices 102, a time code to byte conversion system 106, a media retrieval server 108, media database 144, and media segment index 146. In an embodiment, the user devices 102 are in communication with the media retrieval server 108 via a network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The media database 144 may store media files, such as video files, audio files, audiovisual files, image files, and/or the like, that, when played by a media player, cause the media player to display and/or audibly output content. Each media file may be associated with a play length, have a frame rate, and have a file size, among other attributes. The play length may represent a time it takes a media player to play the entire content of the media file at a normal speed (e.g., 1x speed). The frame rate may indicate a number of frames of the media file that are played each second. The play length can be divided into time intervals that correspond to each frame in the media file, also referred to as time codes (e.g., Society of Motion Picture and Television Engineers (SMPTE) time codes). For example, time codes may be in the following format: hours:minutes:seconds:frames. Thus, a time code corresponding to the first frame of the tenth second of the fourth minute may be represented as 00:04:10:01. The file size may be divided into bytes (or bits) and each time code may correspond to a byte. A byte that corresponds to a time code may represent a portion of the media file (e.g., a byte) at which a particular frame begins to play. In other words, if a media player retrieved a byte corresponding to a first time code and any subsequent bytes for playback, the media player would begin playback at the first time code. In some cases, a plurality of bytes may collectively store data necessary for outputting a single frame. In this situation, the time code may correspond to the first byte in the plurality.

The media database 144 may further store different versions of the same content, where each version has a different file size. For example, the media database 144 may store a first media file that is a low resolution version of first media content (e.g., 240i, 480i, 480p, 576i, 576p, etc.), a second media file that is a high resolution version of the first media content (e.g., 720p, 1080i, 1080p, 4K, 8K, 16K, etc.), a third media file that is a raw version of the first media content, and so on. As an example, the raw version may have the largest file size, the high resolution version may have the next largest file size, and the low resolution version may have the lowest file size. The media database 144 can further store other, intermediate resolution versions of the media content.

The time code to byte conversion system 106 may include a time code to byte mapper 122, a speech recognition system 124, and a natural language processor 126. The time code to byte mapper 122 may be configured to retrieve a media file from the media database 144 and map each time code in the media file to a byte or a range of bytes in the media file at which the respective time code begins. For example, the time code to byte mapper 122 may playback the retrieved media file. As each byte of the retrieved media file is accessed, the time code to byte mapper 122 may store a mapping between the respective accessed byte and a corresponding time code (e.g., the time code that corresponds to a frame that is displayed as a result of accessing the respective byte). Once the time code to byte mapper 122 has mapped each byte of the retrieved media file to a time code, the time code to byte mapper 122 stores the mappings in the media segment index 146 in a table associated with the retrieved media file. Alternatively, the time code to byte mapper 122 can store the mappings in the media segment index 146 in a table associated with the retrieved media file as the time code to byte mapper 122 determines each mapping. An example of a table stored in the media segment index 146 is described in greater detail below with respect to FIG. 3.

The speech recognition system 124 may be configured to (1) extract audio from the media file (e.g., demux the audio from the video in a media file); (2) divide the extracted audio into a plurality of audio segments; (3) identify a mapping between time codes and audio segments in the media file; (4) convert the audio segments into text; and (5) create a mapping between the time codes and the text. For example, the speech recognition system 124 may divide the extracted audio in the audio segments by identifying pauses in speech (e.g., sound below a threshold decibel or volume level) and using the identified pauses as the divisions. When dividing the extracted audio into the audio segments, the speech recognition system 124 can track the beginning time code and the ending time code of each audio segment, thereby creating a mapping between time codes and audio segments (e.g., the beginning time code of an audio segment may be mapped to the audio segment). The speech recognition system 124 may then perform speech recognition on each audio segment using techniques known to those skilled in the art to determine speech recognition results for each audio segment (e.g., a word lattice, a sentence, a transcript, etc.). Because the speech recognition system 124 created a mapping between the time codes and the audio segments, the speech recognition system 124 can then use that mapping to create a mapping between the time codes and the speech recognition results for each audio segment (e.g., if a first time code maps to a first audio segment, then the first time code also maps to the speech recognition results of the first audio segment). The speech recognition system 124 can then send the time code to speech recognition result mappings to the natural language processor 126.

The natural language processor 126 can process the speech recognition results to extract or identify keywords. For example, a user via the user device 102 can transmit keywords to the natural language processor 126 via the media retrieval server 108 (e.g., the user device 102 can make an application programming interface (API) call to the media retrieval server 108 providing one or more keywords). As another example, the natural language processor 126 can be trained to identify keywords using a corpus of text that includes people, places, and/or events. As another example, keywords may be statistically improbable phrases, and the natural language processor 126 can be trained to identify such statistically improbable phrases using a corpus of text (e.g., a corpus of literary works, news articles, journal papers, television or move scripts, and/or the like). The natural language processor 126 can store received keywords and/or keywords derived from training in a database (not shown) internal to the natural language processor 126 or the time code to byte conversion system 106.

Once keywords are determined, the natural language processor 126 can parse the speech recognition results to identify which results include one or more keywords. If a speech recognition result for an audio segment includes one or more keywords, the corresponding keyword(s) are stored by the natural language processor 126 in the media segment index 146 in a table associated with the media file and in an entry associated with the time code mapped to the audio segment.

Optionally, the natural language processor 126 can extract keywords from closed captioning information. For example, the media file may include closed captioning text in one or more languages. The media file may also include a mapping of the closed captioning text to time codes. Alternatively, the natural language processor 126 can map the closed captioning text to time codes using the techniques described herein. The natural language processor 126 can extract the closed captioning text from the media file and parse the closed captioning text to extract or identify keywords in a manner as described above with respect to the speech recognition results. Keywords identified in the closed captioning text can be stored by the natural language processor 126 in the media segment index 146 in a table associated with the media file and in an entry associated with the time code mapped to the closed captioning text. The time code to byte conversion system 106 may repeat the techniques described above for some of or all of the media files in the media database 144 and/or some of or all of the different versions of a media file stored in the media database 144.

A user device 102 can request a portion of, or all of, a media file via the media retrieval server 108. For example, the user may desire to retrieve a select portion of a high resolution version of a media file. In order to determine which portion of the high resolution version of the media file to retrieve, the user via the user device 102 may initially request some of or all of a low resolution version of the media file. Once received, the user device 102 can play the low resolution version of the media file using a media player, thereby allowing the user to identify a time range to retrieve. Once the time range is determined, the user via the user device 102 can transmit a request (e.g., an API call) to the media retrieval server 108 for the high resolution version of the media file, providing an identification of the media file, the version of the media file (e.g., the high resolution version), a start time, and an end time. The media retrieval server 108 can query the media segment index 146 to identify a range of bytes that corresponds to the range of time defined by the received start time and end time. After identifying the range of bytes, the media retrieval server 108 can retrieve bytes of the specified version of the media file (e.g., the high resolution version) that fall within the identified range of bytes. The media retrieval server 108 can then forward the identified range of bytes to the user device 102 for playback.

Alternatively, the user device 102 may not request a low resolution version of the media file. Rather, the user device 102 may transmit to the media retrieval server 108 an identification of the media file, the version of the media file (e.g., the high resolution version), and one or more keywords (e.g., in an API call). For example, the user may provide one or more keywords that describe an event that occurred, a person, a place, a thing, and/or the like in an attempt to retrieve a portion of a media file depicting the event, person, place, thing, and/or the like. The media retrieval server 108 can query the media segment index 146 to identify a range of bytes that corresponds to the one or more keywords provided by the user device 102. After identifying the range of bytes, the media retrieval server 108 can retrieve bytes of the specified version of the media file (e.g., the high resolution version) that fall within the identified range of bytes. The media retrieval server 108 can then forward the identified range of bytes to the user device 102 for playback.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a media player to playback media files and/or a browser application or a standalone application that allows a user to request specific portions of a media file from the media retrieval server 108.

The time code to byte conversion system 106 can be a computing system programmed or otherwise configured to populate the media segment index 146 as described herein. The time code to byte conversion system 106 may process a media file to populate the media segment index 146 when the time code to byte conversion system 106 initially boots, when a new media file is added to the media database 144, when a user device 102 requests a portion of a media file, and/or any combination thereof.

The time code to byte conversion system 106 and/or the media retrieval server 108 of FIG. 1 may be a single computing device or may include multiple distinct computing devices, such as computer servers, logically or physically grouped together to collectively operate as a server system. The components of the time code to byte conversion system 106 and/or the media retrieval server 108 can each be implemented in application-specific hardware (e.g., a server computing device with one or more ASICs) such that no software is necessary, or as a combination of hardware and software. In addition, the modules and components of the time code to byte conversion system 106 and/or the media retrieval server 108 can be combined on one server computing device or separated individually or into groups on several server computing devices. In some embodiments, the time code to byte conversion system 106 and/or the media retrieval server 108 may include additional or fewer components than illustrated in FIG. 1.

In some embodiments, the features and services provided by the time code to byte conversion system 106 and/or the media retrieval server 108 may be implemented as web services consumable via the communication network 110. In further embodiments, the time code to byte conversion system 106 and/or the media retrieval server 108 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The media database 144 and/or the media segment index 146 may be located external to the time code to byte conversion system 106 and/or the media retrieval server 108. For example, the media database 144 and/or the media segment index 146 may be stored and managed by a separate system or server and may be in communication with the time code to byte conversion system 106 and/or the media retrieval server 108 via a direct connection or an indirect connection (e.g., via a network, such as the network 110). In other embodiments, not shown, the media database 144 and/or the media segment index 146 are located within the time code to byte conversion system 106 or the media retrieval server 108.

Example Block Diagram for Generating a Media Segment Index

Figure 2A:
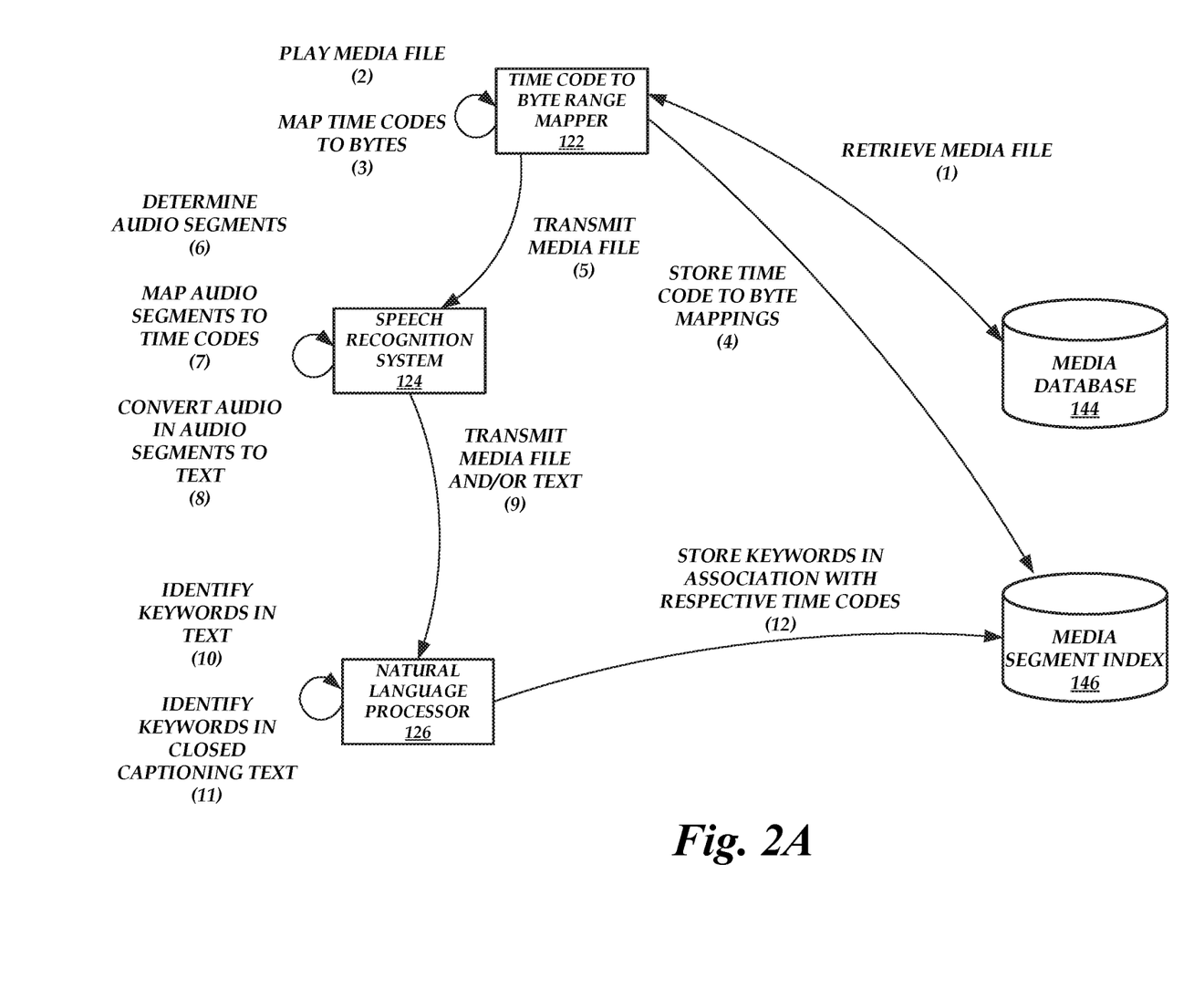
FIG. 2A is a block diagram of the time code to byte indexing environment of FIG. 1 illustrating the operations performed by the components of the time code to byte indexing environment to generate a media segment index, according to one embodiment.

FIG. 2A is a block diagram of the time code to byte indexing environment 100 of FIG. 1 illustrating the operations performed by the components of the time code to byte indexing environment 100 to generate a media segment index, according to one embodiment. As illustrated in FIG. 2A, the time code to byte mapper 122 may retrieve a media file from the media database 144 at (1). The time code to byte mapper 122 may then play the retrieved media file at (2). Based on the playback of the retrieved media file, the time code to byte mapper 122 can map time codes to bytes at (3) in a manner as described above and store the time code to byte mappings in the media segment index 146 in a table associated with the retrieved media file at (4).

The time code to byte mapper 122 may transmit the retrieved media file to the speech recognition system 124 at (5). Alternatively, the speech recognition system 124 can retrieve the media file from the media database 144, not shown. The speech recognition system 124 can determine audio segments from an audio stream extracted from the media file at (6). The speech recognition system 124 can then map the audio segments to time codes at (7). For example, the speech recognition system 124 can track the beginning time code and the ending time code of each audio segment when determining the audio segments, thereby creating a mapping between time codes and audio segments (e.g., the beginning time code of an audio segment may be mapped to the audio segment). The speech recognition system 124 can then perform speech recognition on the audio segments by converting the audio in the audio segments into text at (8). The audio segment to time code mapping can be used to create a text to time code mapping. The speech recognition system 124 may transmit the media file and/or the text to the natural language processor 126 at (9), including the mapping of text to time codes. While steps (6) through (9) are depicted as occurring after steps (2) through (4), this is not meant to be limiting. For example, the time code to byte conversion system 106 may perform steps (6) through (9) before steps (2) through (4).

The natural language processor 126 can identify keywords in the text provided by the speech recognition system 124 at (10). For example, the natural language processor 126 can receive a list of keywords to identify from the user device 102 and/or the natural language processor 126 can be trained to identify specific keywords. Optionally, the natural language processor 126 can extract closed captioning text from the media file and identify keywords in the closed captioning text at (11). Because the natural language processor 126 receives a text to time code mapping and the media file includes a mapping of closed captioning text to time codes, the natural language processor 126 can identify times codes associated with identified keywords. The natural language processor 126 can therefore store keywords in association with their respective time codes in the media segment index 146 in a table associated with the media file at (12).

Example Block Diagram for Retrieving a Portion of a Media File

Figure 2B:
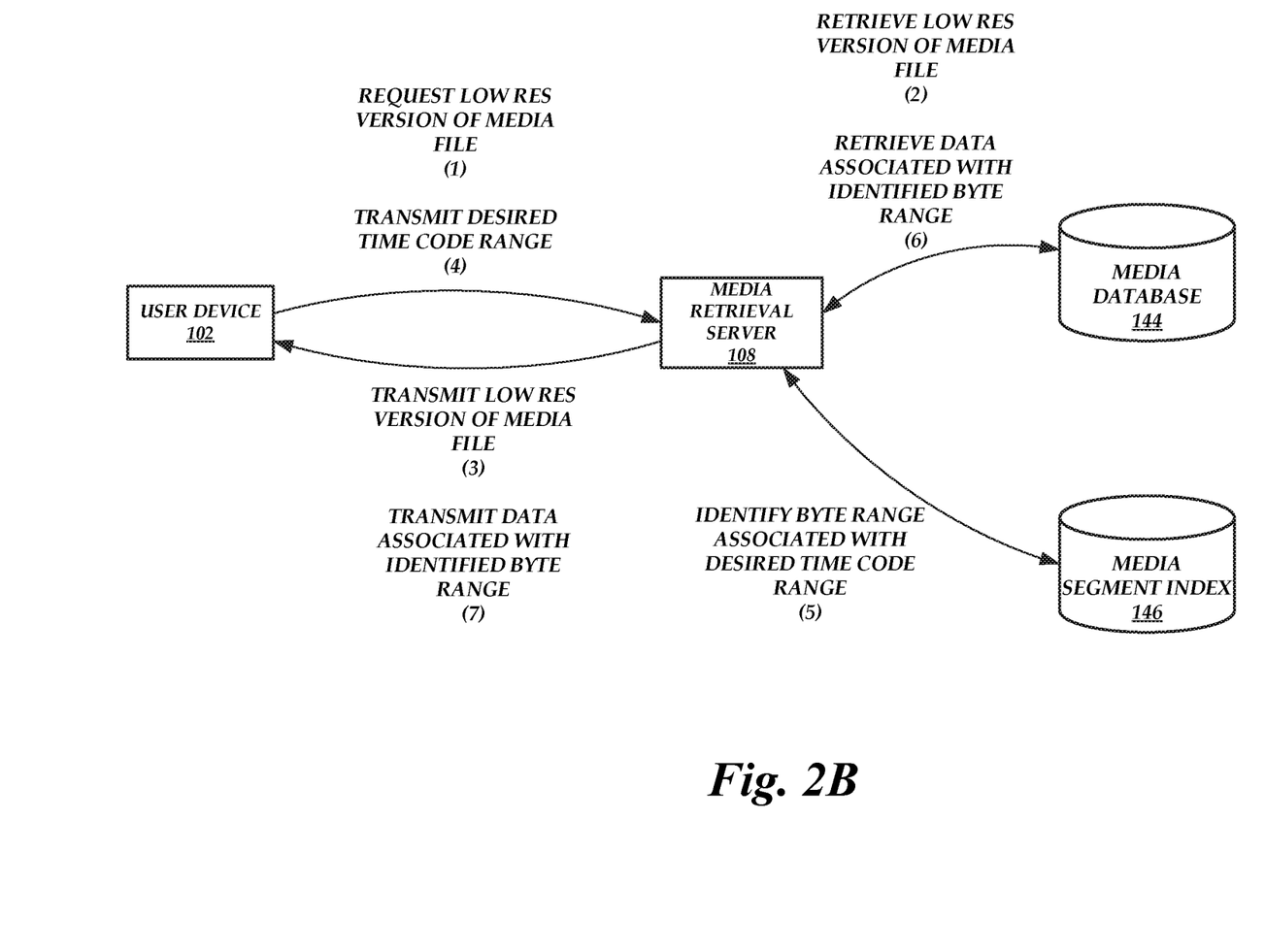
FIG. 2B is a block diagram of the time code to byte indexing environment of FIG. 1 illustrating the operations performed by the components of the time code to byte indexing environment to retrieve a range of bytes corresponding to a received time code range, according to one embodiment.

FIG. 2B is a block diagram of the time code to byte indexing environment 100 of FIG. 1 illustrating the operations performed by the components of the time code to byte indexing environment 100 to retrieve a range of bytes corresponding to a received time code range, according to one embodiment. As illustrated in FIG. 2B, the user device 102 requests a low resolution version of a media file from the media retrieval server 108 at (1). The media retrieval server 108 can retrieve the low resolution version of the media file from the media database 144 at (2) and transmit the retrieved low resolution version of the media file to the user device 102 at (3).

The user device 102 may play the low resolution version of the media file, allowing the user to determine a time range corresponding to a desired portion of the media file to retrieve. The user device 102 can transmit a desired time code range (e.g., a start time code and an end time code) to the media retrieval server 108 at (4). The media retrieval server 108 can identify a byte range associated with the desired time code range by querying the media segment index 146 at (5). For example, the user device 102 may specify that a portion of a high resolution version of the media file is to be retrieved, and thus the media retrieval server 108 can identify a byte range associated with the desired time code range by querying a table in the media segment index 146 associated with the high resolution version of the media file.

Once the byte range associated with the desired time code range is identified, the media retrieval server 108 can retrieve data from the media database 144 associated with the identified byte range at (6). For example, the media retrieval server 108 can retrieve bytes of a high resolution version of the media file that fall within the identified byte range from the media database 144. The media retrieval server 108 can then transmit the retrieved data to the user device 102 at (7) to satisfy the user device 102 request at step (4).

Alternatively, instead of retrieving data from the media database 144 that is associated with the identified byte range, the media retrieval server 108 can restore data associated with the identified byte range from archive storage, store the restored data in the media database 144, and/or transmit the restored data to the user device 102 at (7) to satisfy the user device 102 request at step (4). As an illustrative example, a low resolution version of the media file may be stored in the media database 144 or any other readily-accessible storage device (e.g., a solid state drive, a disk drive, flash memory, etc.). However, given the larger file size of a high resolution version of the media file, it may be more expensive to store the high resolution version of the media file in the media database 144. Thus, the high resolution version of the media file may be archived in archive storage, stored in a backed up format in backup storage, or otherwise stored in a less-accessible, but cheaper, storage device (e.g., a tape storage drive). Once the byte range is identified, the media retrieval server 108 can restore, from the archive storage, backup storage, or otherwise less-accessible storage device, bytes of the high resolution version of the media file that fall within the identified byte range. The media retrieval server 108 can then transmit the restored bytes to the user device 102 at (7) to satisfy the user device 102 request at step (4). Optionally, the media retrieval server 108 can also store the restored bytes in the media database 144 as a new version of the media file (e.g., a partial copy of a high resolution version of the media file).

Example Table in Media Segment Index

Figure 3:
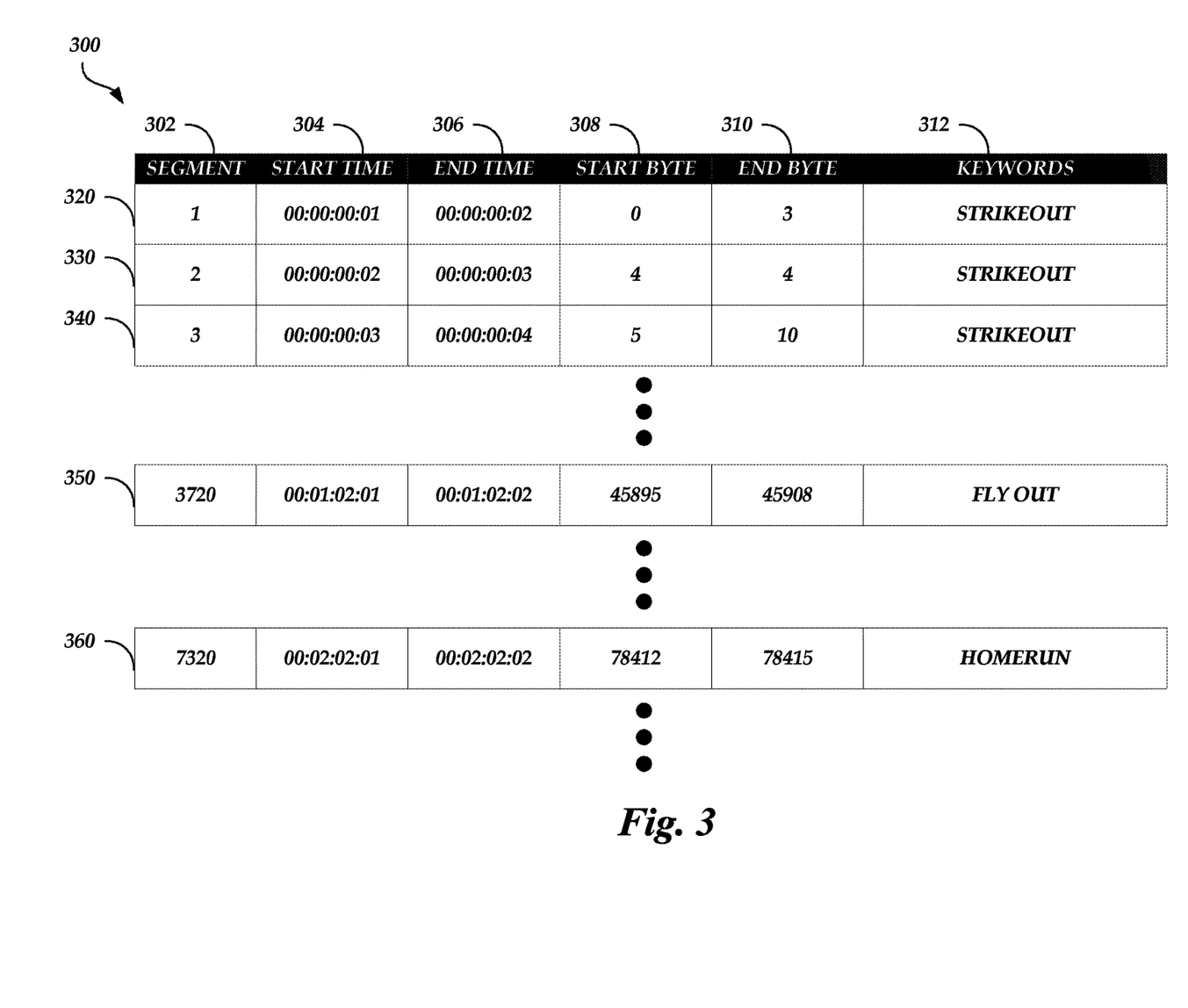
FIG. 3 is an exemplary table stored in the media segment index of FIG. 1, according to one embodiment.

FIG. 3 is an exemplary table 300 stored in the media segment index 146 of FIG. 1, according to one embodiment. As illustrated in FIG. 3, the table 300 is associated with a particular version of a first media file stored in the media database 144. For example, the table 300 may be associated with a high resolution version of the first media file.

The table 300 may include a segment header 302, a start time header 304, an end time header 306, a start byte header 308, an end byte header 310, and a keywords header 312.

The table 300 may further includes rows 320, 330, 340, 350, 360, and so on for each segment (e.g., each time code) of the media file. The segment header 302 may identify an identification of a segment corresponding to a time code; the start time header 304 may identify a start time code for the respective segment; the end time header 306 may identify an end time code for the respective segment; the start byte header 308 may identify a start byte for the respective segment as determined by the time code to byte mapper 122; the end byte header 310 may identify an end byte for the respective segment as determined by the time code to byte mapper 122; and the keywords header 312 may identify one or more keywords for the respective segment that identifies content displayed during the start and end time codes as determined by the natural language processor 126.

As illustrated in FIG. 3, there is a nonlinear relationship between time code ranges and byte ranges. For example, in row 320, for a time code range of 00:00:00:01, the byte range is 4. However, in row 330, for a time code range of 00:00:00:01, the byte range is 1. In some cases, the relationship of time code ranges to byte ranges may be the same. For example, in row 360, the byte range is 4 for a time code range of 00:00:00:01, which is the same as in row 320.

Example Media Segment Index Building Routine

Figure 4:
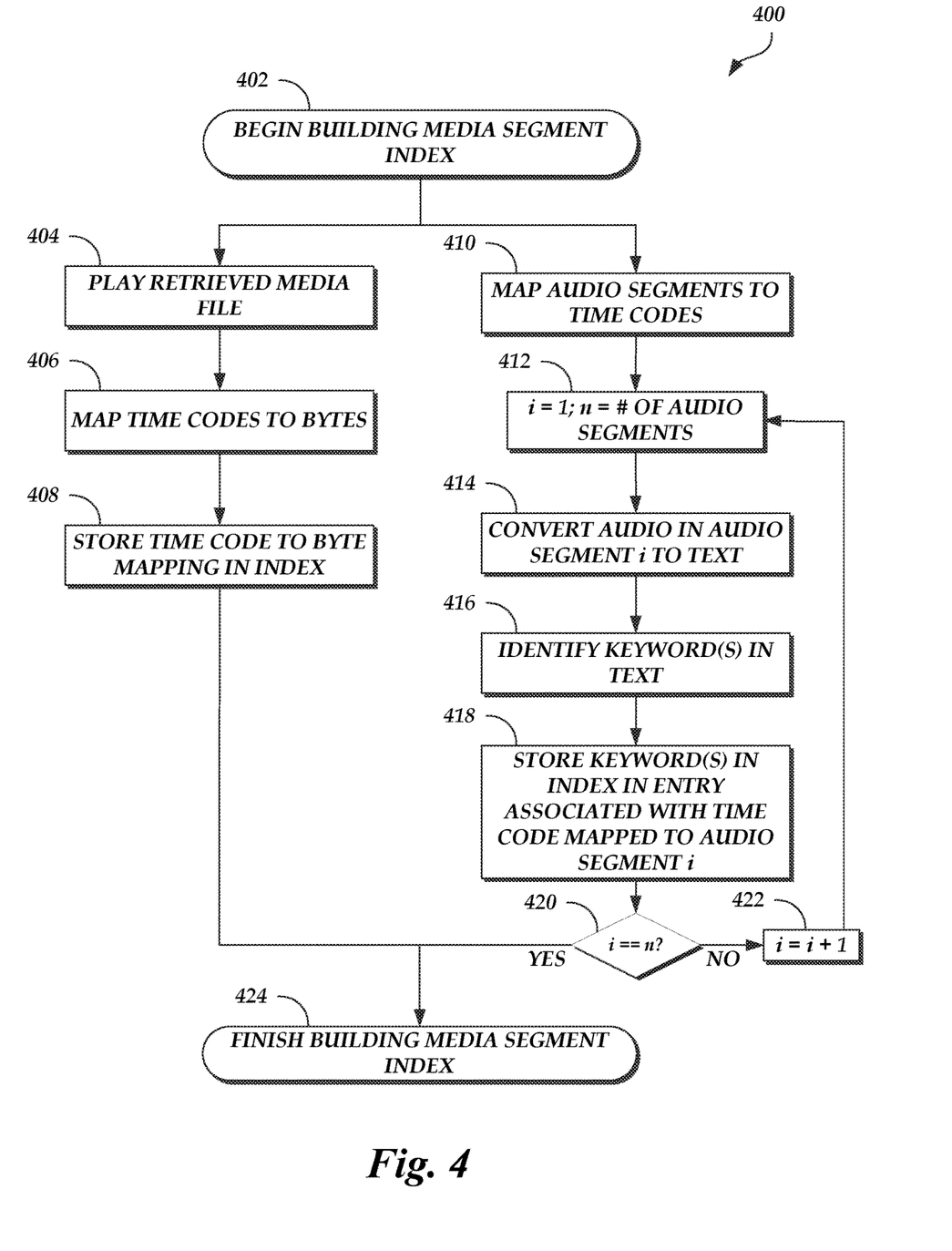
FIG. 4 is a flow diagram depicting a routine for building a media segment index illustratively implemented by the time code to byte conversion system of FIG. 1, according to one embodiment.

FIG. 4 is a flow diagram depicting a media segment index building routine 400 illustratively implemented by a time code to byte conversion system, according to one embodiment. As an example, the time code to byte conversion system 106 of FIG. 1 can be configured to execute the media segment index building routine 400. The media segment index building routine 400 begins at block 402.

At block 404, a retrieved media file is played. While the retrieved media file is played, time codes are mapped to bytes at block 406. For example, each time a byte of the retrieved media file is accessed, the respective byte is mapped to the time code that corresponds to a frame that is displayed as a result of accessing the respective byte.

At block 408, the time code to byte mappings are stored in an index. For example, the time code to byte mappings can be stored in the media segment index 146.

As part of the media segment index building routine 400, an audio stream may be extracted from the media file and divided into audio segments (e.g., pauses in speech may mark divisions in the audio stream from which audio segments are determined). At block 410, the audio segments are mapped to time codes. For example, each audio segment may be mapped to a time code at which the audio segment begins.

At block 412, variable i is set equal to 1, and variable n is set equal to the number of audio segments. The variables may be set such that each audio segment can be processed to identify keywords.

At block 414, audio in audio segment i is converted to text. For example, speech recognition techniques may be used to convert the audio to text.

At block 416, keyword(s) in the text are identified. For example, the natural language processor 126 may search for keywords in the text provided to the natural language processor 126 by the user device 102 or determined as a result of training on a corpus of text.

At block 418, the identified keyword(s) are stored in the index in an entry associated with the time code mapped to audio segment i. For example, the identified keyword(s) can be stored in the media segment index 146.

At block 420, a determination is made as to whether the variable i equals the variable n. If the two variables are equal, this indicates that all audio segments of the media file have been processed and the media segment index building routine 400 may be complete, as shown in block 424. Otherwise, all audio segments of the media file have not been processed and the media segment index building routine 400 proceeds to block 422.

At block 422, variable i is incremented by 1. After block 422 is complete, the media segment index building routine 400 proceeds back to block 410 and repeats blocks 410 through 420 until all audio segments of the media file are processed.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   as implemented by one or more computing devices configured with specific executable instructions,
   retrieving a first media file from a data store, wherein the first media file comprises a plurality of time codes and a plurality of bytes;
   playing the first media file;
   accessing a first byte in the plurality of bytes in response to playing the first media file;
   identifying a first time code in the plurality of time codes based on accessing the first byte, wherein the first time code corresponds to a frame that is displayed as a result of accessing the first byte in the plurality of bytes;
   mapping the first time code to the first byte;
   storing the mapping of the first time code to the first byte in an index;
   dividing an audio stream of the first media file into a plurality of audio segments, wherein a first audio segment in the plurality of audio segments is mapped to the first time code;
   performing speech recognition on the first audio segment to determine a keyword;
   storing a mapping of the keyword to the first time code in the index;
   receiving a request for a portion of the first media file from a user device, wherein the request comprises a start time code and an end time code;
   querying the index to identify a range of bytes in the plurality of bytes corresponding to time codes in the plurality of times codes between the start time code and the end time code;
   retrieving the range of bytes from the data store; and
   transmitting the range of bytes to the user device.

2. The computer-implemented method of claim 1 further comprising:
   extracting the audio stream from the first media file; and
   mapping the keyword to the first time code.

3. The computer-implemented method of claim 2 further comprising receiving the keyword from the user device.

4. The computer-implemented method of claim 2 further comprising:
   receiving a corpus of text; and
   processing the corpus of text to identify the keyword.

5. The computer-implemented method of claim 1 further comprising:
   retrieving a second media file;
   extracting closed captioning text from the second media file, wherein words in the closed captioning text are mapped to time codes in a second plurality of time codes;
   parsing the closed captioning text to identify one or more second keywords; and
   storing a mapping of the identified one or more second keywords to the corresponding time code in the second plurality of time codes in the index.

6. The computer-implemented method of claim 5 further comprising:
receiving a second request for a portion of the second media file from the user device, wherein the second request comprises a third first keyword in the one or more second keywords;
querying the index to identify a second range of bytes in a second plurality of bytes corresponding to the third keyword;
retrieving the second range of bytes from the data store; and
transmitting the second range of bytes to the user device to satisfy the second request for the portion of the second media file.

7. A system comprising:
a data store configured to store a first media file, wherein the first media file comprises a plurality of time codes and a plurality of bytes;
a media segment index configured to store a mapping between time codes and bytes; and
a time code to byte conversion system comprising a processor and memory, wherein the memory includes instructions that, when executed by the processor, cause the time code to byte conversion system to:
retrieve the first media file from the data store;
play the first media file;
access a first byte in the plurality of bytes in response to playing the first media file;
identify a first time code in the plurality of time codes corresponding to a frame that is displayed as a result of accessing the first byte in the plurality of bytes;
map the first time code to the first byte;
store the mapping of the first time code to the first byte in the media segment index in a table associated with the first media file;
divide an audio stream of the first media file into a plurality of audio segments; wherein a first audio segment in the plurality of audio segments is mapped to the first time code;
perform speech recognition on the first audio segment to determine a keyword; and
store a mapping of the keyword to the first time code in the index.

8. The system of claim 7, wherein the data store is further configured to store a second media file, wherein the second media file is a lower resolution version of the first media file.

9. The system of claim 8 further comprising a media retrieval server, wherein second instructions, when executed, cause the media retrieval server to:
receive a request for the second media file from a user device;
retrieve the second media file from the user device;
transmit the second media file to the user device;
receive a second request for a portion of the first media file, wherein the second request comprises a start time code and an end time code; and
querying the media segment index to identify a range of bytes in the plurality of bytes corresponding to time codes in the plurality of times codes between the start time code and the end time code.

10. The system of claim 9 wherein the second instructions, when executed, further cause the media retrieval server to:
retrieve the range of bytes from the data store; and
transmit the range of bytes to the user device to satisfy the second request for the portion of the first media file.

11. The system of claim 9 wherein the second instructions, when executed, further cause the media retrieval server to:
restore the range of bytes from archive storage; and
transmit the restored range of bytes to the user device to satisfy the second request for the portion of the first media file.

12. The system of claim 7, wherein the instructions, when executed by the processor, further cause the time code to byte conversion system to:
extract the audio stream from the first media file; and
map the keyword to the first time code.

13. The system of claim 12, wherein the instructions, when executed by the processor, further cause the time code to byte conversion system to receive the keyword from a user device.

14. The system of claim 12, wherein the instructions, when executed by the processor, further cause the time code to byte conversion system to:
receive a corpus of text; and
process the corpus of text to identify the keyword.

15. The system of claim 12, wherein the instructions, when executed by the processor, further cause the time code to byte conversion system to:
identify a portion of the audio stream having a sound below a threshold volume level; and
divide the audio stream into the plurality of audio segments using the identified portion of the audio stream as a division.

16. The system of claim 7, wherein the instructions, when executed by the processor, further cause the time code to byte conversion system to:
extract closed captioning text from the first media file, wherein words in the closed captioning text are mapped to time codes in the plurality of time codes;
parse the closed captioning text to identify one or more second keywords; and
store a mapping of the identified one or more second keywords to the corresponding time code in the plurality of time codes in the media segment index.

17. The system of claim 16 further comprising a media retrieval server, wherein second instructions, when executed, cause the media retrieval server to:
receive a request for a portion of the first media file from a user device, wherein the request comprises a third first keyword in the one or more second keywords;
query the media segment index to identify a range of bytes in the plurality of bytes corresponding to the third first keyword;
retrieve the range of bytes from the data store; and
transmit the range of bytes to the user device to satisfy the request for the portion of the first media file.

18. A non-transitory computer-readable medium having stored thereon executable program code that directs a system to perform operations when executed, the operations comprising:
retrieving a first media file, wherein the first media file comprises a plurality of bytes and is associated with a plurality of time codes;
accessing a first byte in the plurality of bytes in response to playing the first media file;
identifying a first time code in the plurality of time codes corresponding to a frame that is output as a result of accessing the first byte;
mapping the first time code to the first byte;
storing the mapping of the first time code to the first byte in a media segment index associated with the first media file;

dividing an audio stream of the first media file into a plurality of audio segments, wherein a first audio segment in the plurality of audio segments is mapped to the first time code;

performing speech recognition on the first audio segment to determine a keyword;

storing a mapping of the keyword to the first time code in the index; and transmitting the first byte to a user device in response to a request for a portion of the first media file between a specified time range that includes the first time code.

19. The non-transitory computer-readable medium of claim 18, wherein the operations further comprise:

mapping the identified keyword to the first time code.

20. The non-transitory computer-readable medium of claim 18, wherein the operations further comprise:

extracting closed captioning text from the first media file, wherein words in the closed captioning text are mapped to time codes in the plurality of time codes;

parsing the closed captioning text to identify a second keyword; and storing a mapping of the second keyword to the corresponding time code in the plurality of time codes in the media segment index associated with the first media file.

21. The non-transitory computer-readable medium of claim 20, wherein the operations further comprise:

receiving a request for a portion of the first media file from a user device, wherein the request comprises the second keyword;

querying the media segment index to identify a range of bytes in the plurality of bytes corresponding to the second keyword;

retrieving the range of bytes; and transmitting the range of bytes to the user device to satisfy the request for the portion of the first media file.

\* \* \* \* \*